United States Patent [19]
Ueyoko et al.

[11] Patent Number: 5,885,388
[45] Date of Patent: Mar. 23, 1999

[54] PNEUMATIC TIRE WITH SWELLED BEAD CORE INNER SURFACE

[75] Inventors: Kiyoshi Ueyoko; Shinichi Miyazaki; Tetsuhiro Fukumoto, all of Kobe, Japan

[73] Assignee: Sumitomo Rubber Industries, Ltd., Hyogo-ken, Japan

[21] Appl. No.: 827,062

[22] Filed: Mar. 26, 1997

[30] Foreign Application Priority Data

| Mar. 26, 1996 | [JP] | Japan | 8-069942 |
| Jun. 19, 1996 | [JP] | Japan | 8-158349 |
| Nov. 20, 1996 | [JP] | Japan | 8-309501 |

[51] Int. Cl.⁶ ............................. B60C 15/00; B60C 15/04
[52] U.S. Cl. ..................... 152/540; 152/525; 152/539; 152/546; 152/547; 152/564; 245/1.5
[58] Field of Search ...................... 152/539, 540, 152/546, 547, 525, 564; 245/1.5

[56] References Cited

U.S. PATENT DOCUMENTS 4,321,957  3/1982  Hahn et al. ............................ 152/540
5,429,168  7/1995  Lobb et al. ......................... 152/540 X

FOREIGN PATENT DOCUMENTS

| 518053 | 9/1979 | Australia | 152/539 |
| 1380138 | 10/1964 | France . | |
| 2234126 | 1/1975 | France . | |
| 2466357 | 4/1981 | France . | |
| 2591154 | 6/1987 | France | 245/1.5 |
| 56-53904 | 5/1981 | Japan . | |
| 1042861 | 9/1966 | United Kingdom | 152/540 |
| 1059821 | 2/1967 | United Kingdom | 152/540 |

*Primary Examiner*—Adrienne C. Johnstone

[57] ABSTRACT

A pneumatic tire comprises a bead core disposed in each of a pair of bead portions and a carcass ply turned up around the bead cores, wherein the bead cores are provided in the radially inner surface with a swell having a radius of curvature in the range of from 0.35 to 2.0 times the width of the bead core. The swell preferably extends all over the width of the bead core whereby no rubber layer is formed between the carcass ply and the radially inner surface of the bead core, and the contact pressure between the tire and rim is optimized.

15 Claims, 12 Drawing Sheets

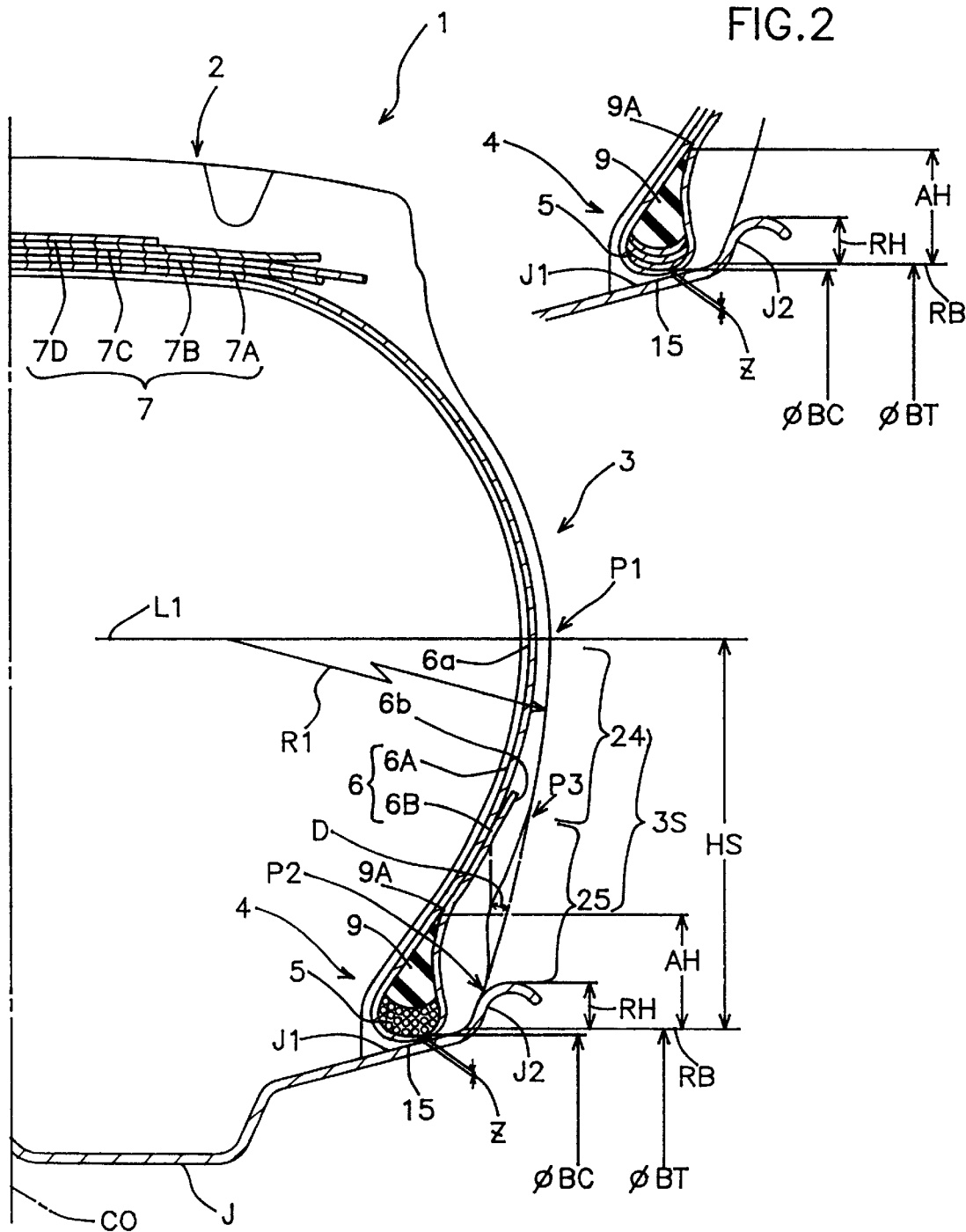

COMPARATIVE ART

COMPARATIVE ART

PNEUMATIC TIRE WITH SWELLED BEAD CORE INNER SURFACE

BACKGROUND OF THE INVENTION

The present invention relates to a pneumatic tire, more particularly to an improvement in the bead structure which is capable of improving the bead durability and suitable for use in a heavy duty tire such as a truck/bus tire.

A pneumatic tire is provided in each bead portion with a bead core whose cross sectional shape is a circle, rectangle, parallelogram, hexagon or the like.

In a conventional pneumatic tire for heavy duty use such as a truck/bus tire, the cross sectional shape of the bead core is usually a compressed hexagon such as shown in FIG. 19. The bead core (b) is located such that the longer side G1 is substantially parallel to the bead seat j1 of the rim J when mounted on the rim which is typically a standard 15 degree drop-center rim. Around the bead core (b), a carcass ply (c) is turned up to be secured thereto.

When such tire is vulcanized, the topping rubber of the carcass ply (c), the topping rubber of the bead wire, the topping rubber of a bead wrapping cambus (bw) around the bead core (b) and the like partially migrate or flow and collect between the longer side G1 of the bead core (b) and the carcass ply (c) to form a rubber layer (A).

It is difficult to estimate the thickness of the collected rubber layer (A) because it varies depending on various parameters such as the carcass cord tension during tire vulcanization, variation of the carcass turnup profile, variation of the topping rubber volume and the like. Further, the thickness of the collected rubber layer varies not only between different tires but also between the different positions in the same tire.

If the thickness of the gathered rubber layer increases, the thickness of rubber (chafer rubber) under the carcass is decreased, and accordingly the contact pressure between the bead and rim's bead seat decreases because the collected rubber is mainly topping rubber which is softer than chafer rubber. As a result, the contact pressure between the axially outer surface of the bead portion and the axially inner surface of the rim flange j2 is relatively increased, and the carcass ply turnup portion (f) tends to be damaged, which greatly decreases the bead durability.

This problem is particularly remarkable in a heavy duty pneumatic tire which is mounted on a tapered rim having a relatively large taper angle and used under heavy load and high pressure conditions.

If the thickness of the rubber under the carcass is increased in order to lessen the influence of the variation of the collected rubber layer thickness, the rim mounting operation becomes very difficult.

SUMMARY OF THE INVENTION

It is therefore, an object of the present invention to provide a pneumatic tire in which the above-mentioned collected rubber layer is eliminated to optimize the contact pressure between the tire and rim and thus to improve bead durability.

According to one aspect of the present invention, a pneumatic tire comprises a tread portion, a pair of sidewall portions, a pair of bead portions with a bead core therein, and a carcass ply extending between the bead portions and turned up around the bead cores to be secured thereto, wherein in a cross section of the tire including the tire axis, the bead core is provided in the radially inner surface thereof with a swell, the swell having a radius of curvature in the range of from 0.35 to 2.0 times the width of the bead core, and the swell protruding radially inwardly in the center of the bead core in the widthwise direction thereof so that the radially inner surface has no straight part which is parallel to the rim's bead seat.

The carcass ply is then turned up around the bead core, closely adjoining the radially inner surface of the bead core. Thus, the collected rubber layer is completely eliminated from between the carcass and bead core, and the thickness of the bead base rubber under the carcass is improved in accuracy. Accordingly, an undesirable decrease in the contact pressure between the bead base and the rim's bead seat can be prevented. As a result, an excessive increase in the contact pressure between the rim flange and the axially outer surface of the bead portion can be also prevented.

Therefore, the turnup portions of the carcass is prevented from being damaged and the bead durability is greatly improved.

BRIEF DESCRIPTION OF THE DRAWINGS

Embodiments of the present invention will now be described in detail in conjunction with the accompanying drawings, wherein FIG. 1 is a cross sectional view of a tire according to the present invention in which the bead core is made of a wire or wires.

FIG. 2 is a cross sectional view of the bead portion in which the bead core is made of strips of steel or strips of fiber reinforced plastic.

DETAILED DESCRIPTION OF THE INVENTION

Figure 3:
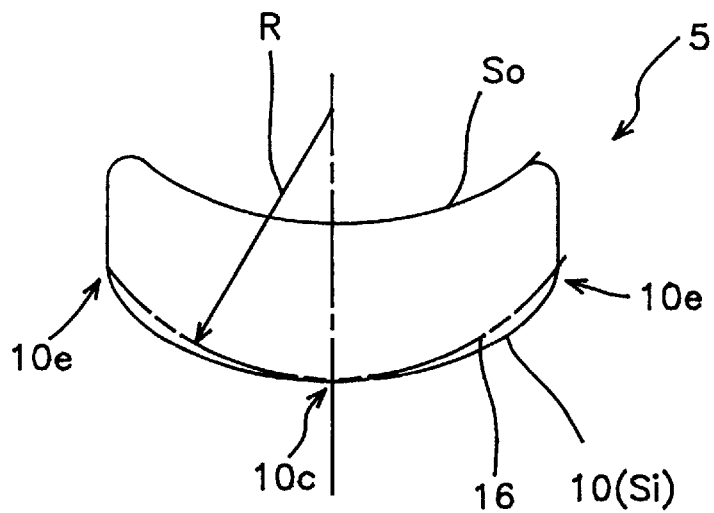
FIG. 3 is a view showing an example of the contour of the bead core.

In the drawings, the pneumatic tire 1 according to the present invention is a tubeless radial tire for heavy duty use such as truck/bus tires, which is mounted on a standard 15 degree drop-center rim J.

The tire 1 comprises a tread portion 2, a pair of axially spaced bead portions 4, a pair of sidewall portions 3 extending between the tread edges and the bead portions 4, a pair of bead cores 5 each disposed in each of the bead portions 4, a carcass 6 extending between the bead portions 4 through the tread portion 2, sidewall portions 3, and a belt 7 disposed radially outside the carcass 6 and inside the tread.

In FIG. 1, the state of a tire which is mounted on the standard rim J and inflated to a standard inner pressure but loaded with no load is shown.

The standard rim J comprises a pair of axially spaced bead seats J1 disposed one on each side of a central rim well, and a pair of rim flanges J2 each extending radially outwardly from the axially outer edge of each of the bead seats. As mentioned above, the bead seats in this example have a taper of 15 degrees.

The carcass 6 comprises at least one rubberized ply of cords arranged radially at an angle in the range of from 90 to 70 degrees with respect to the tire equator CO to have a radial or semiradial structure.

For the cords, organic fiber cords, e.g. nylon, rayon, polyester, aromatic polyamide and the like and steel cords can be used.

In the drawings, the carcass 6 consists of a single ply 6a of steel cords arranged radially at an angle of substantially 90 degrees with respect to the tire equator CO.
The carcass ply 6a extends between the bead portions 4 through the tread portion 2 and sidewall portions 3 and is turned up around the bead core 5 in each bead portion 4 from the axially inside to the outside of the tire along the contour of the bead core 5 to form a pair of turnup portions 6B and a main portion 6A therebetween.
Between the main portion 6A and each of the turnup portions 6B, a bead apex 9 made of hard rubber is disposed.
The bead apex 9 tapers radially outwardly from the radially outside (Si) of the bead core 5.
The radially outer end of the turnup portion 6B is positioned radially outward of the radially outer end 9A of the bead apex 9, and the turnup portion 6B adjoins the main portion 6A to form the adjoining part 6b on the radially outside of the outer end 9A of the bead apex 9.
In the adjoining part 6b, the turnup portion 6B and the main portion 6A can be in a direct contact relationship.
However, for the prevention of ply separation failure caused by the sharing force generated by tire deformation during running, the thickness of rubber between the main portion 6A and each turnup portion 6B can be set in the range of not less than 0.3 mm, preferably not less than 1.6 mm.

The belt 7 in this example comprises four plies of steel cords, in which the radially innermost ply 7A is composed of steel cords laid in parallel with each other at an angle of 60 degrees plus or minus 10 degrees with respect to the tire equator CO, and each of the remaining plies 7B, 7C and 7D is composed of steel cords laid in parallel with each other at an angle of not more than 30 degrees with respect to the tire equator CO. The cords in each ply are crosswise to those of the next ply.

As shown in FIG. 1, the bead apex height AH measured radially from the bead base line RB to the outer end 9A of the bead apex 9 is in the range of from 0.5 to 3.0 times the rim flange height RH measured radially from the bead base line RB to the radially outer end of the rim flange J2. Preferably, the height AH is set to be not less than 1.0 times the height RH.

By setting the height AH not more than 3.0 times the height RH, it becomes possible to reduce the compressive strain which is produced in the turnup portion 6B when the tire is deformed. Thus, the turnup portion 6B can be improved in durability, and the bead apex 9 is decreased in its volume to control the heat generation therefrom.

If the height AH is less than 0.5 times the height RH, air is liable to remain between the bead apex 9 and the turnup portion 6B to increase the number of inferior tires.

In a cross section of the tire including the tire axis, the bead core 5 is provided with a radially inwardly protruding swell 10 in the radially inner surface Si and a radially inwardly caved-in concavity 11 in the radially outer surface So.

The swell 10 has a smoothly curved contour, which preferably has a single radius R of curvature.

The radius R is set in the range of from 0.35 to 2.0 times the width W of the bead core 5.

The width W of the bead core 5 is defined as the axial distance between the axially outermost points or sides V1 and V1, and the inner surface Si and outer surface So are defined as extending therebetween.

FIG. 3 shows an example of the contour of the bead core, wherein the maximum protruding part or point 10c of the swell 10 is positioned in the center in the widthwise direction of the core, and the maximum caved-in part or point of concavity 11 is also positioned in the center in the widthwise direction so that the bead core 5 has a symmetrical cross sectional shape.

Figure 12:
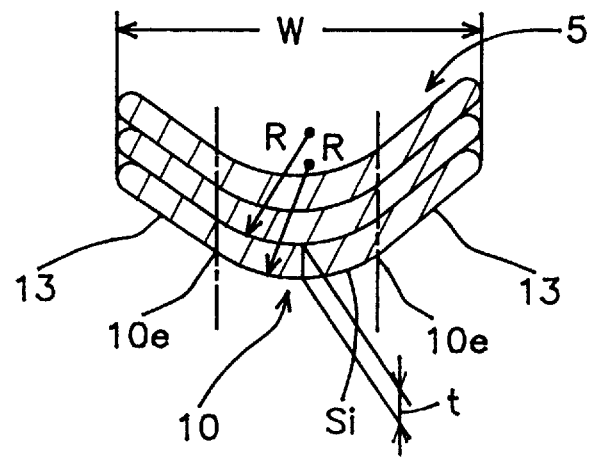

Preferably, the swell 10 extends all over the width W of the bead core 5 as shown in FIGS. 3, 4, 7, 9 and 10 so that the inner surface Si is composed of only the swell 10. However, the swell 10 can be extend in a central part only as shown in FIGS. 5 and 12, wherein the inner surface Si is composed of the swell 10 and a pair of lateral parts 13 having a straight contour which is a tangential line to the contour of the swell at the edge 10e. Thus, the lateral parts 13 are each disposed on side of the swell 10 and connect with the swell at the edge 10e without forming any inflection point.

Figure 11:
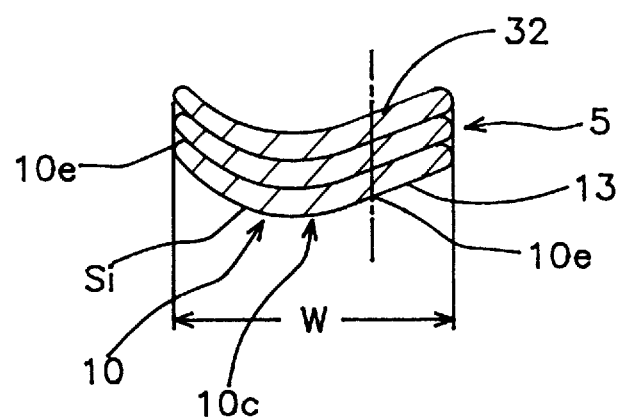

Further, such a modification by eliminating one of the lateral parts 13 is possible. Therefore, the inner surface Si is composed of the swell 10 and one straight part 13 as shown in FIG. 11.

As explained above, for the contour of the swell 10, a single radius curve is preferably used, but a smoothly curved line such as an ellipse, a parabola, a multi radius curve and the like and further a combination thereof may be used.
If the contour is not a single radius curve, the above-mentioned radius R can be defined as of a circle 16 passing through three points: the radially innermost point 10c and axially outermost ends 10e and 10e of the swell 10, as shown in FIG. 3.

If the radius R is less than 0.35 times the width W, the collected rubber layer (A) can not be completely eliminated, and the bead compression becomes improper.

Although the radius R is set in the range of not less than 0.35 times the width W, if the radius R is less than 0.5 times, it becomes difficult to form the swell 10 which extends over the entire width W of the inner surface Si.
In this case, therefore, a straight part 13 is provided on at least one side of the swell 10, and thus the radius R is preferably set to be not less than 0.50 times, more preferably not less than 0.55 times the width W in order to prevent the carcass cords from a stress concentration on the outer end of the straight part 13.

Further, the width W1 of the swell 10 is preferably not less than 50% of the width W of the bead core 5.

If the radius R is more than 2.0 times the width W, the effect of eliminating the collected rubber layer decreases, and further an edged corner is liable to be formed between the inner surface Si and side surface V1 of the bead core 5 and a problem of carcass cord fatigue arises.

Thus, the radius R is more preferably set in the range of not more than 1.0 times, still more preferably not more than 0.7 times the width W.

Incidentally, the width W of the bead core 5 is for example 4 to 40 mm.

The above-mentioned concavity 11 in the outer surface So of the bead core 5 has a contour defined by a smoothly curved line similar to the swell 10, and the concavity 11 is substantially parallel to the swell 10.

Preferably, the concavity 11 extends overall the width W of the outer surface So so that the outer surface So and inner surface Si of the bead core 5 are substantially parallel with each other.

As a result, the concavity 11 helps to reduce the weight of the bead core 5.

Further, in cooperation with the swell 10, the concavity 11 decreases the bending rigidity of the bead core 5, and improves the rim mounting performance, while maintaining the engaging force between the tire and rim at a sufficient level because the bead compression is improved by the elimination of the collected rubber layer.

Furthermore, into the concavity 11, the radially inner end of the above-mentioned bead apex 9 is inserted. Accordingly, the concavity 11 improves the positioning accuracy of the bead apex 9 during building of the raw tire. Thus both the tire uniformity and production efficiency can be improved.

The diameter of the bead core 5 is determined based on the diameter of the rim J. That is, the inside diameter BC measured at the radially innermost point of the bead core 5 is set to be not more than the rim diameter BT, more preferably not more than the rim diameter BT−2 mm, whereby, movements of the carcass and rubber around the bead core 5 under heavy load conditions are decreased to prevent ply loose failure.

As a result, the bead durability is further improved. Thus, it becomes unnecessary to dispose a bead reinforcing layer furthermore, which helps to reduce the tire weight.

By setting the difference between the rim diameter BT and bead core inside diameter BC in the range of not less than 2 mm, the deformation of the bead portion 4 can be effectively reduced, and the lift-up of the bead toe can be prevented in a state where the tire is mounted on the rim J. However, in order to prevent the carcass cords from coming out in the bead base 15, the radial distance between the carcass 6 and rim's bead seat J1 is set in the range of not less than 1.5 mm in the state where the tire is mounted on the rim, and the minimum distance (z) between the bead core 5 and the rim's bead seat J1 is set in the range of from 0.8 to 6.0 mm in order to prevent ply separation and enhance bead durability.

If the minimum distance (z) is less than 0.8 mm, the chafer rubber 20 is liable to be broken at this location. If this happens, air penetrates the carcass ply, and ply separation failure is induced in the clinch region.

If the minimum distance (z) is more than 6.0 mm, the inside diameter BC of the bead core increases, and the bead durability decreases.

The above-mentioned bead cores 5 according to the present invention can be formed by winding at least one bead wire 30. This type of bead core (Wire type bead core) is shown in FIGS. 1, 4, 5, 6 and 17. For the bead wire 30, a steel wire whose diameter is, for example, about 1.55 mm is used.

For a first example of the bead core, the bead core is composed of windings of a single rubberized wire 30. Usually, this type of bead core is formed, as shown in FIG. 6, using an annular winding mold 34 having a profiled concavity 33 which corresponds to the contour of the inner surface of the bead core 5.

The wire 30 is continuously and spirally wound around the profiled concavity 33 until the windings reach a given number.

Figure 6:
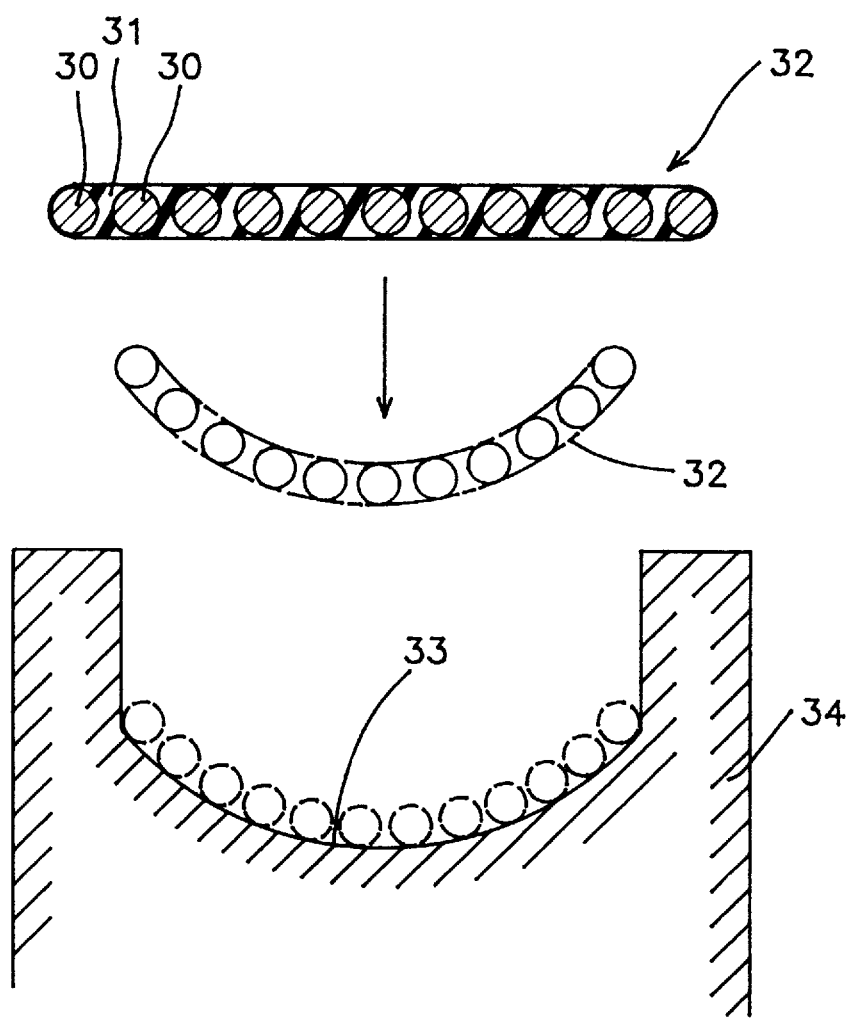
FIG. 6 is a diagram explaining a method of making a wire type bead core.

During winding of the wire, as shown in FIG. 6, it is possible to first make a full-width layer by starting the winding from one edge of the bottom surface thereof to the other, and then, the spiral winding is continued, returning to the opposite side to make further full-width layers (2nd, 3rd . . . ) on the previous full-width layer.

As another example of the winding, it is also possible to first wind the wire in the central portion of the concavity 33 to form windings corresponding to the central portion of the innermost layer, and then gradually increasing the width, to wind subsequent layers on the previous various-width layers. This method is particularly useful when the bead core has no concavity 11.

For a second example of the bead core, the bead core is composed of continuous windings of a strip (hereinafter a bead tape 32) of rubberized parallel wires 30.

That is to say, a plurality of bead wires 30 are laid in parallel with each other and coated with rubber topping 31 in the form of a tape.

The bead tape 32 is lap-wound several times, threefold in the figures, to make the bead core 5.

In the tire building process, in order to make the bead core separately, the bead tape 32 is lap-wound around the above-explained profiled concavity 33 of the winding mold 34 as shown in FIG. 6.

However, it is also possible to lap-wind the bead tape directly around the carcass ply.

In any case, the bead tape 32 is preferably shaped to the concavity prior to winding.

However, it is also possible to wind the flat tape 32 while being shaped.

FIGS. 7, 9, 10, 11, 12 and 16 show still other examples of the bead core 5, each composed of continuous windings of a tape-like tension member (hereinafter bead tape 32.)

The bead tape 32 is lap-wound several times.

For the bead tape 32, a strip of high-carbon steel and fiber reinforced plastics such as an epoxy resin, a polyimide resin, a polyether-ether ketone resin, a nylon and the like reinforced with nonextensible fiber such as an aramid fiber, carbon fiber, glass fiber, carbon silicon fiber, boron fiber and the like can be used.

The radially inner surface of the bead tape 32 is profiled according to the above-mentioned curved contour of the swell 10.

The thickness (t) of the bead tape 32 is set in the range of from 0.6 to 2.0 mm.

If the thickness (t) is less than 0.6 mm, the rigidity decreases and it becomes difficult for the bead core to maintain its shape.

If the thickness (t) is more than 2.0 mm, a relatively large difference in diameter occurs at the ends of the bead tape 32, causing a difference in bead core rigidity, and further an adhesive failure is liable to occur between the tape end and the rubber.

Preferably, the thickness (t) is slightly changed in the widthwise direction thereof so that the thickness gradually decreases from the center towards both the edges such that both the outer and inner surfaces of the bead tape 32 have an identical contour whereby any gap between the adjacent windings (or layers) is minimized to improve bead durability. In this case, the maximum thickness is set in the above-mentioned range of from 0.6 to 2.0 mm.

The edges of the bead tape 32 are rounded so as not to damage the carcass cords.

Preferably, the ratio W/t between the width W of the bead core and the thickness (t) of the bead tape 32 is about 4 to 40. The width W is 4 to 40 mm as explained above.

Similarly to the former bead tape, the bead core can be made separately by lap-winding the bead tape 32 around the winding mold 34.

However, the bead tape is preferably wound directly around the carcass ply because the bead tape can self-hold its profiled shape.

When the bead tape 32 is wound separately, the windings are preferably wrapped with a thin rubber strip.

Figure 8:
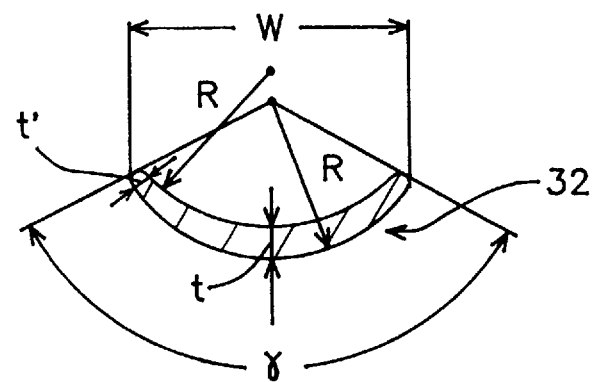
FIG. 8 is a cross sectional view of the strip.
Figure 9:
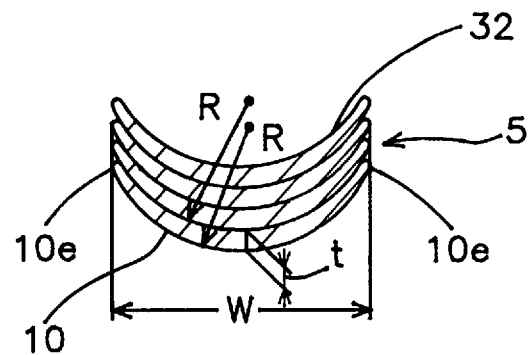
FIGS. 9, 10, 11 and 12 are cross sectional views, each showing other examples of the strip type bead core.
Figure 10:
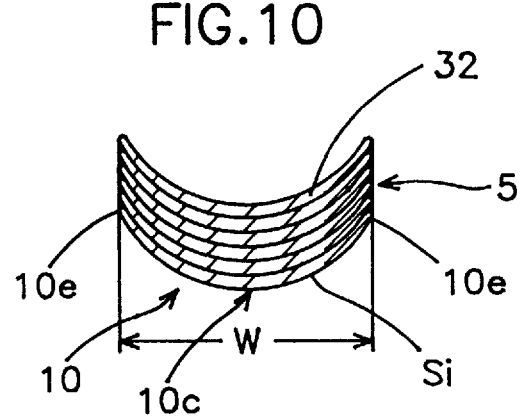

The number of lap-windings is preferably in the range of from 3 to 6. In FIGS. 4, 5, 7, 11, 12 and 16, the bead tape 32 is lap-wound threefold. In FIG. 9, the bead tape 32 is thinner and wound fourfold. In FIG. 10, the bead tape 32 is more thinner and thus wound sixfold. FIG. 8 shows the bead tape 32 used in the core of FIG. 7, wherein the angle γ is 123 degrees for example.

Figure 7:
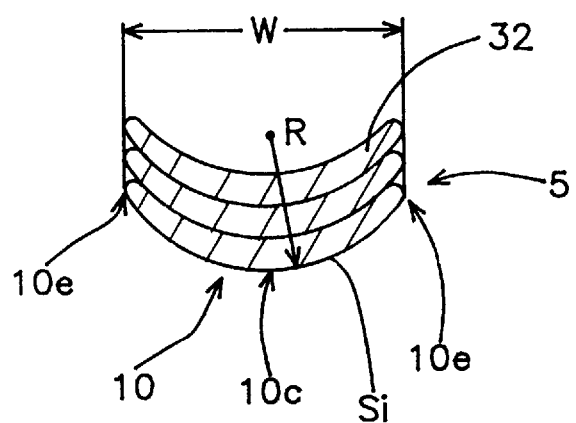
FIG. 7 is a cross sectional view showing a strip type bead core.

FIG. 11 shows a modification of the example of FIG. 7, where the inner surface of the bead core 5 is composed of a swell 10 and a straight part 13 disposed to one side of the swell 10.

Figure 16:
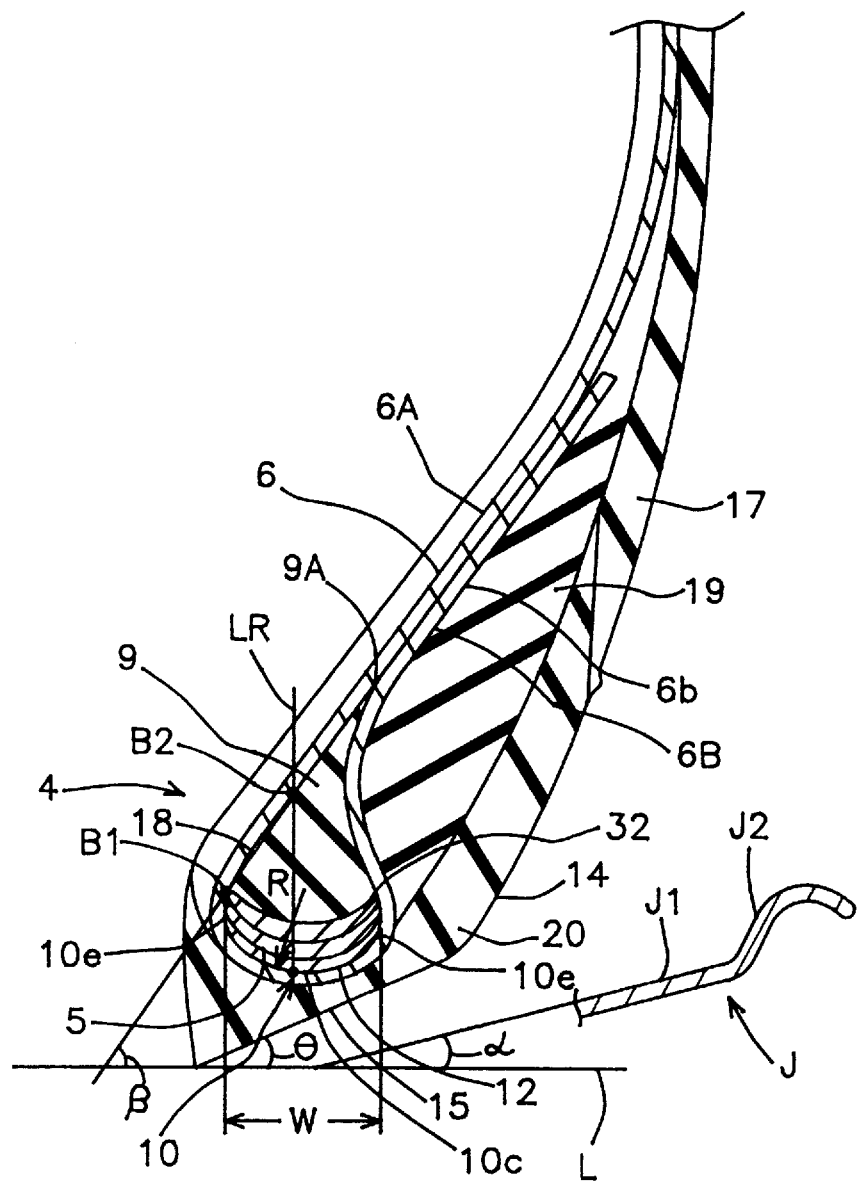
FIGS. 16 and 17 are cross sectional views, each showing an example of the bead contour and structure.
Figure 17:
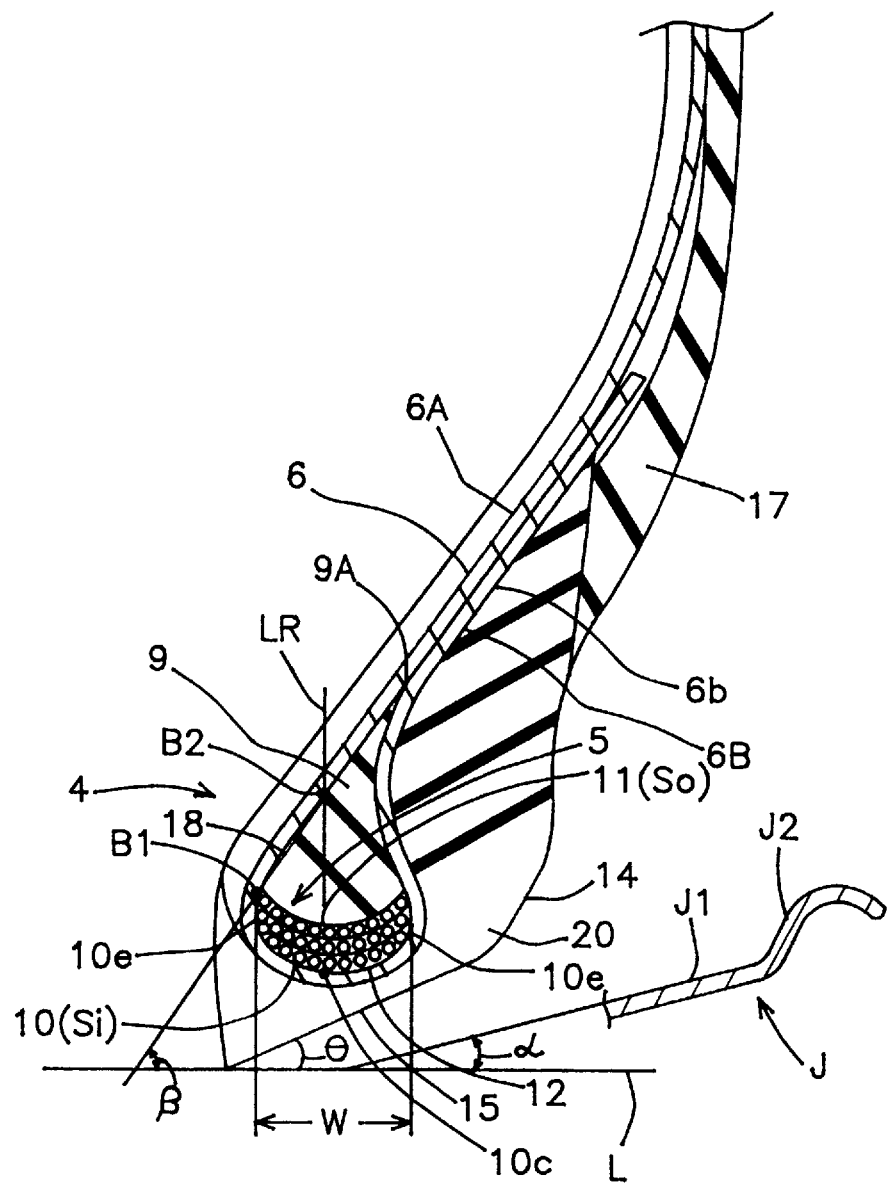

FIGS. 16 and 17 show two examples of the structure from the bead portion to lower sidewall portion.

In FIG. 16, a sidewall rubber 17 extends from the tread edge to the bead portion, defining the outer surface of the sidewall portion 3.

A chafer rubber 20 extends from the radially inner end of the sidewall rubber 17 to the bead bottom, defining the axially outer surface 14 and bottom surface 15 of the bead portion 4 which contacts with the bead seat J1 and flange J2 of the rim J.

Further, a side packing rubber 19 is disposed between the turnup portion 6B of the carcass 6 and the chafer rubber 20 and sidewall rubber 17 so as to extends radially outwardly beyond the radially outer edge of the carcass turnup portion.

The 100% modulus MS of the sidewall rubber 17 is 10 to 20 kgf/sq.cm, the 100% modulus MP of the side packing rubber 19 is 14 to 47 kgf/sq.cm, the 100% modulus MC of the chafer rubber 20 is 55 to 71 kgf/sq.cm, the 100% modulus MA of the bead apex 9 is 14 to 84 kgf/sq.cm, and the 100% modulus MT of the topping rubber of the carcass 6 is 37 to 47 kgf/sq.cm. More preferably, the 100% modulus MP is not less than 37 kgf/sq.cm, and the 100% modulus MA is not less than 64 kgf/sq.cm.

As a result, the distribution of the rigidity of the bead portion 4 is optimized so as to disperse the bead deformation in a wide range. Thus, fatigues of the carcass cords near the radially outer end 9A of the bead apex 9 can be prevented, and also a ply edge loose and ply separation failure can be prevented.

If MA is more than 84 kgf/sq.cm, MP is more than 47 kgf/sq.cm, MS is more than 20 kgf/sq.cm, and MC is more than 71 kgf/sq.cm, then the bead rigidity excessively increases, and the strength of the carcass cords decreases near the radially outer end 9A of the bead apex 9, and a ply loose is caused.

If MA and MP are less than 14 kgf/sq.cm, MS is less than 10 kgf/sq.cm, and MC is less than 55 kgf/sq.cm, then a sufficient bead rigidity can not be obtained, and the running performance is greatly decreased.

The sidewall rubber 17 having a relatively lower modulus MS easily follows the carcass deformation, and the high modulus chafer rubber 20 improves the unseating resistance. Therefore, a carcass ply separation and conveyance of stress from the sidewall portion to the bead portion 4 can be prevented.

Further, as the modulus MT is more than the moduli MA and MP and less than MC, the carcass 6 follows the deformation of the bead portion 4 and ply looseness and the like can be prevented.

In FIG. 17, to decrease the tire weight by decreasing the rubber volume of the bead portion, a thinner part 25 is provided as shown in FIG. 1, wherein the contour of the outer surface 3s between the maximum tire section width point P1 and point P2 where the bead portion 4 starts to contact with the rim flange J2 consists of a convex part 24 which has a radius of curvature R1 whose center is located on the inside of the tire on an axial line L1 passing the point P1 and a concave part 25 which extends between the point P2 and the radially inner end P3 of the convex part 24, passing axially inside of an extended line of the convex part 24 (shown by a chain line.)

The convex part 24 and concave part 25 are smoothly connected with each other without forming any inflection point. The maximum depth D of the concave part 25 measured from the above-mentioned extended line is in the range of from 0.03 to 0.20 times the height HS of the maximum width point P1 from the bead base line RB.

In this example, the sidewall rubber 17 extends from the tread edge to the beadportion, defining the outer surface of the sidewall portion 3, and the chafer rubber 20 extends from the radially inner end of the sidewall rubber 17 to the bead bottom, defining the axially outer surface 14 and bottom surface 15 of the bead portion which contact with the bead seat J1 and rim flange J2 of the rim.

In this structure, a side packing rubber 19 is not disposed, and therefore, the chafer rubber is made thicker than that in the former example.

Further, the 100% modulus MS of the sidewall rubber 17 is 10 to 20 kgf/sq.cm, the 100% modulus MA of the bead apex 9 is 14 to 84 kgf/sq.cm, the 100% modulus MC of the chafer rubber 20 is 55 to 71 kgf/sq.cm, the 100% modulus MT of the topping rubber of the carcass 6 is 37 to 47 kgf/sq.cm. More preferably, the 100% modulus MA is not less than 64 kgf/sq.cm.

If MA is more than 84 kgf/sq.cm, MS is more than 20 kgf/sq.cm, and MC is more than 71 kgf/sq.cm, then the bead rigidity excessively increases, and the strength of the carcass cords decreases near the radially outer end 9A of the bead apex 9, and a ply loose is caused.

If MA is less than 14 kgf/sq.cm, MS is less than 10 kgf/sq.cm, and MC is less than 55 kgf/sq.cm, then a sufficient bead rigidity can not be obtained, and running performance is greatly decreased.

As the bead apex 9 and chafer rubber 20 is set in the above-mentioned ranges, the deformation of the bead portion 4 spreads in a wide area, preventing the carcass cords from being bent near the radially outer end 9A of the bead apex 9. Thus, a decrease in the strength, and carcass ply separation and looseness can be prevented.

The sidewall rubber 17 having a relatively lower modulus MS easily follows the carcass deformation, and the high modulus chafer rubber 20 improves the unseating resistance. Therefore, carcass ply separation and conveyance of stress from the sidewall portion to the bead portion 4 can be prevented.

Further, as the modulus MT is more than the modulus MA and less than MC, the carcass 6 follows the deformation of the bead portion 4 and thus looseness and the like can be prevented.

As shown in FIGS. 16 and 17, the inclination angle β of the carcass main portion in the bead portion is set in the range of from 45 to 60 degrees with respect to the tire axial direction.

Here, the angle β is defined as of a straight line 18 which is drawn between a point B1 at which the carcass main portion 6A starts to separate from the bead core 5 and the intersection B2 between the carcass main portion 6A and a radial line passing the radially innermost point 10c.

By setting the angle β in the above-mentioned range, the carcass profile under the normally inflated state is optimized to decrease the rubber volume in the bead portion 4, and thus heat generation and damages therefrom can be prevented. If the angle β is outside the above-mentioned range, the heat generation increases.

Further, the taper angle θ of the bead base 15 of the tire is set in the range of from 1.0 to 1.9 times, more preferably 1.2 to 1.9 times the taper angle α of the bead seat J1 of the rim J, each angle measured with respect to the axial direction.

As a result, the engaging force between the bead portion 4 and the rim J is increased, while maintaining the rim mounting performance, and the unseating resistance can be improved. If the angle θ is less than 1.0 times the angle α, the engaging force does not increase effectively, and thus the unseating resistance can not be effectively improved. If the angle θ is more than 1.9 times the angle α, the rim mounting performance decreases because the bead portion 4 necessitates its excessive compression when mounting on the rim.

By combining the bead structure shown in FIG. 17 with the bead core 5 with the swell 10 and concavity 11, the tire weight can be effectively reduced, while controlling the bead deformation, heat generation and bead durability.

Comparison Tests

Test tires having the same internal structure shown in FIG. 1 except for the bead core and bead contour were made and tested as follows. The tires were a truck/bus radial tire of size 11R22.5, and the standard rim therefore is a 15 deg dropcenter rim whose rim size is 22.5×8.25.

Bead Heat Generation Test

Using a test drum, the test tire was run at a speed of 20 km/h, and the temperature of the bead portion was measured every 1000 kilometer running. The inner pressure was 8.00 ksc, and the tire load was 9000 kg.

In the tables, the mean value thereof is indicated by an index based on that the conventional tire is 100, wherein the smaller the value, the lower the heat generation.

Tire Weight

In the tables, the weight of the test tire is indicated by an index based on that the conventional tire is 100, wherein the smaller the value, the lighter the weight.

Rim Mounting Test

The mounting operation was evaluated into three ranks (good, no good, difficult) by an ordinarily skilled worker.

Bead Damage Test and Turnup Cord Strength Test

Using a drum tester, the test tire was run for 8000 km at a speed of 20 km/h. However, the test running was stopped when some change (damage) appeared. Then, the tire was subjected to a cut-open inspection for carcass ply loose failure. (Inner pressure: 10.00 ksc, tire load: 9000 kg)

After the bead damage test was done, the carcass cords in the turnup portion was took out, and the strength thereof was measured. The results are indicated in Table 2 by an index based on that Ex.13 is 100. The larger the value, the higher the strength.

Results of Bead Damage Test

Conventional tire

When the running distance was 3800 to 6100 km, a visible damage appeared in all of the five tires tested. The damage was a swell near a point at which the tire starts to contact with the rim flange caused by cord looseness in the carcass turned up portion.

Ex.11, 14, 15 tires

All the tires completed the test running, and no visible damage appeared, but upon cut-open inspection, a looseness of the carcass cords in the carcass turned up portion was found in one of the five tires.

Ex.12, 13, 16 to 24 tires

All the tires completed the test running, and upon cut-open inspection, no damage was found.

Ref.11 tire

All the tires completed the test running, but upon cut-open inspection, a looseness of the carcass cords in the carcass turned up portion was found in two of the five tires.

Ref.12 tire

All the tires completed the test running, but upon cut-open inspection, a looseness of the carcass cords in the carcass turned up portion was found in all of the five tires.

Ref.13 tire

When the running distance was 4900 to 6100 km, a visible damage appeared in all of the five tires tested. The damage was a swell near a point at which the tire starts to contact with the rim flange caused by cord looseness in the carcass turned up portion.

Bead Compression Test

Figure 18A:
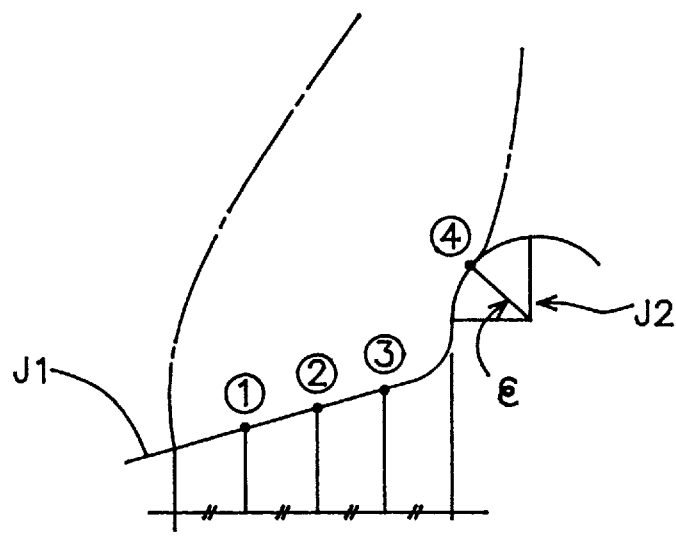
FIG. 18(A) is a diagram showing points for measuring bead compression.
Figure 18B:
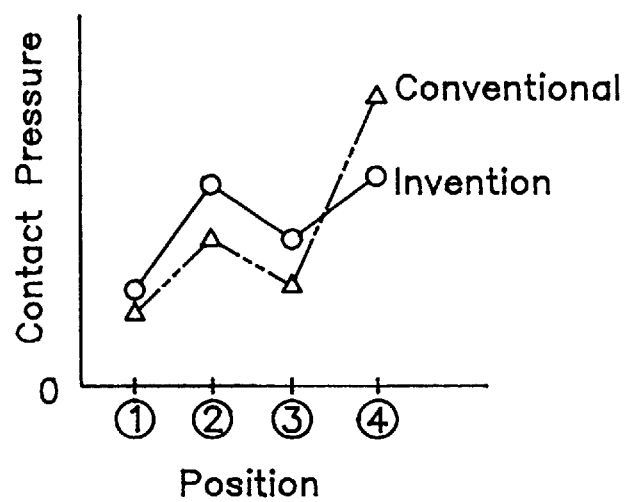
FIG. 18(B) is a diagram showing a comparison in bead compression between the present invention and the conventional tire.
Figure 19:
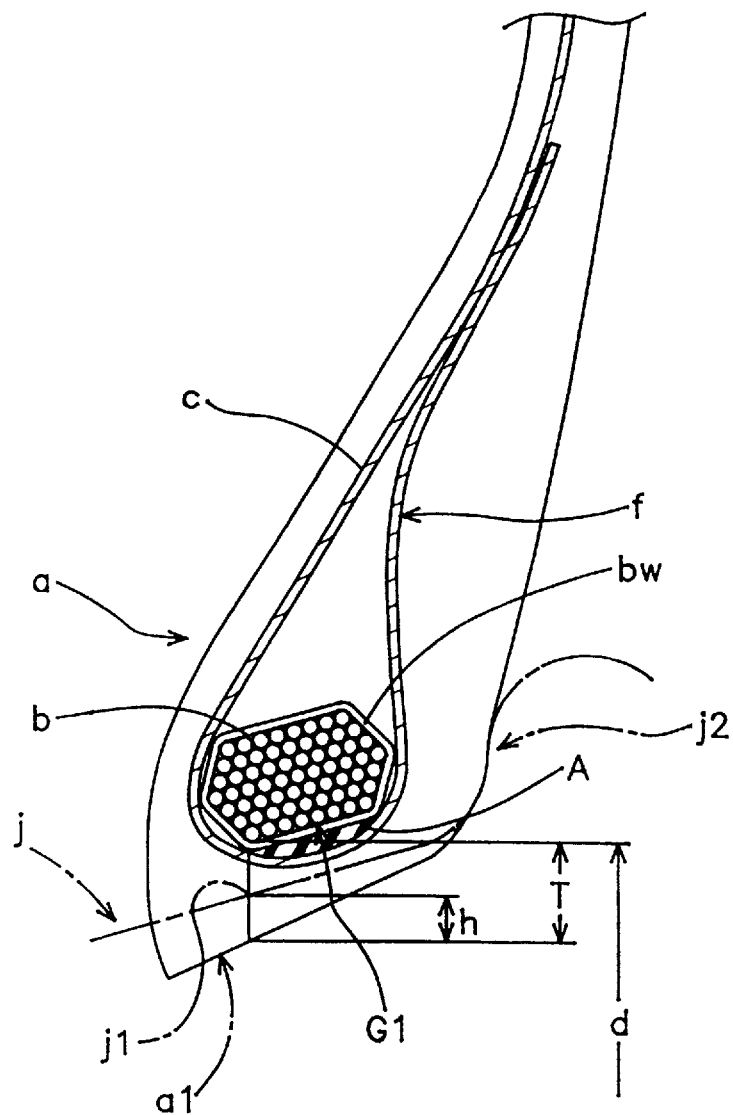
FIG. 19 is a cross sectional view showing the conventional art.

Using the conventional tire and Ex.2 tire in Table 1, the contact pressure between the bead and rim was measured. The test tire was mounted on a standard rim J and inflated to a standard inner pressure and the contact pressure was measured with pressure sensors. As shown in FIG. 18(A), the sensors were disposed at three positions 1 to 3 in the bead base area J1 and one position 4 in the rim flange area J2 (angle ε=45 deg), and the results are shown in FIG. 18(B). From the test results, it was confirmed that, in comparison with the conventional tire, the contact pressure of the tire according to the present invention was increased in the bead base area, but decreased in the rim flange area, and thus, it was optimized.

From the tests, as shown in Tables 1 and 2, it was confirmed that the tires according to the invention can be greatly improved in heat generation and thus the bead durability, without deteriorating the rim mounting performance.

Further, the tire weight can be greatly decreased, because it becomes possible to decrease the section area of the bead apex without decreasing the contact pressure between the bead base and rim' bead seat.

As described above, in the pneumatic tires according to the present invention, the gathered rubber layer under the bead core is eliminated and the contact pressure between the tire and rim is optimized. Accordingly, the carcass turnup portions can be prevented from being damaged and the bead portions are greatly improved in the durability. By providing the concavity, the bead core weight is reduced, and the positioning of the bead apex is improved to improve the uniformity and efficiency. By winding the tape-like tension member, the number of windings is greatly decreased to improve the production efficiency.

The present invention is suitably applied to a tubeless pneumatic tire for heavy duty use, which is mounted on a drop-center rim. The results are effective when the bead seat has a taper angle in the range of from 13 to 33 degrees and thus the bead compression is high. However, the invention can be applied to a tire of which taper angle is outside the range, for example 5 or 10 degrees.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

TABLE 1

Figure 4:
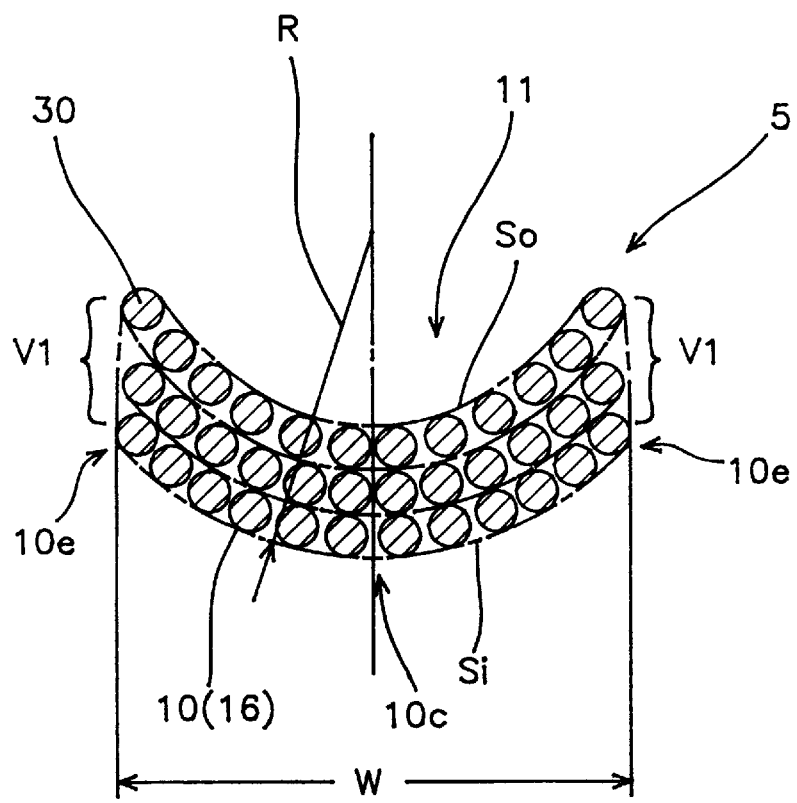
FIG. 4 is a cross sectional view of an example of a wire type bead core.
Figure 5:
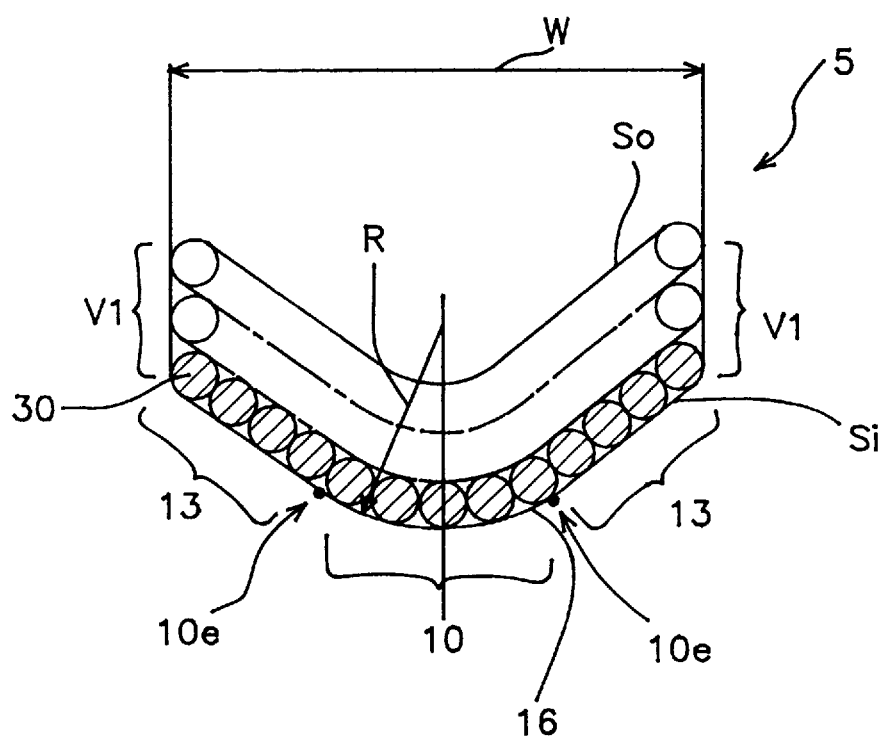
FIG. 5 is a cross sectional view showing another example of the embodiment of the bead core.
Figure 14:
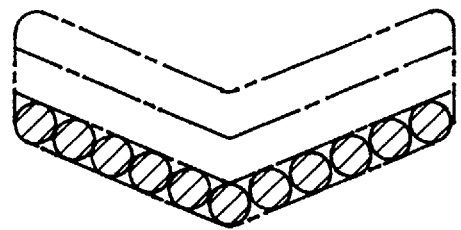
Figure 15:
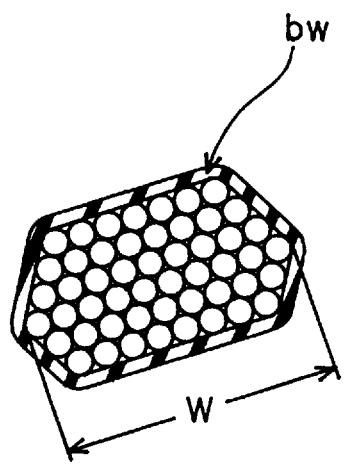
FIG. 15 is a cross sectional view of a bead core used in the conventional tire in Tables 1 and 2.

| Tire | Ex. 1 | Ex. 2 | Ex. 3 | Ex. 4 | Ex. 5 | Ex. 6 | Ex. 7 | Ex. 8 | Ref. 1 | Ref. 2 | Ref. 3 | Conv. |
|---|---|---|---|---|---|---|---|---|---|---|---|---|
| Bead contour | FIG. 16 | FIG. 16 | FIG. 16 | FIG. 16 | FIG. 16 | FIG. 16 | FIG. 16 | FIG. 17 | FIG. 16 | FIG. 16 | FIG. 16 | FIG. 20 |
| Bead core contour | FIG. 5 | FIG. 5 | FIG. 4 | FIG. 4 | FIG. 4 | FIG. 4 | FIG. 4 | FIG. 4 | FIG. 5 | FIG. 4 | FIG. 14 | FIG. 15 |
| Type of windings | tape | tape | tape | tape | tape | tape | single wire | single wire | tape | tape | tape | single wire |
| Wire diameter (mm) | 1.55 | 1.55 | 1.55 | 1.55 | 1.55 | 1.55 | 1.55 | 1.55 | 1.55 | 1.55 | 1.55 | 1.55 |
| Radious R (mm) | 8.4 | 8.4 | 16.8 | 25.2 | 33.6 | 8.4 | 8.4 | 8.4 | 5.6 | 42 | 9.2 | — |
| Bead core width W (mm) | 24 | 16.8 | 16.8 | 16.8 | 16.8 | 16.8 | 16.8 | 16.8 | 28 | 16.8 | 16.8 | 17 |
| R/W | 0.35 | 0.5 | 1 | 1.5 | 2 | 0.55 | 0.5 | 0.5 | 0.2 | 2.5 | — | — |
| Minimum distance z (mm) | 3.5 | 3.5 | 3.5 | 3.5 | 3.5 | 3.5 | 3.5 | 3.5 | 3.5 | 3.5 | 3.5 | 3.5 |
| Test results | | | | | | | | | | | | |
| Bead heat generation | 88 | 83 | 85 | 87 | 88 | 83 | 84 | 81 | 92 | 98 | 97 | 100 |
| Tire weight | 90 | 88 | 88 | 88 | 88 | 88 | 88 | 86 | 92 | 90 | 88 | 100 |
| Rim mounting | good | good | good | good | good | good | good | good | no good | no good | no good | no good |

TABLE 2

| Tire | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|
| Bead contour | FIG. 16 | FIG. 16 | FIG. 16 | FIG. 16 | FIG. 16 | FIG. 16 | FIG. 16 | FIG. 16 | FIG. 16 |
| Bead core contour | FIG. 12 | FIG. 12 | FIG. 9 | FIG. 9 | FIG. 9 | FIG. 9 | FIG. 9 | FIG. 9 | FIG. 9 |
| Thickness t (mm) | 1.5 | 1.5 | 1.5 | 1.5 | 1.5 | 1.5 | 1.5 | 1.5 | 1.5 |
| Radious R (mm) | 8.4 | 8.4 | 16.8 | 25.2 | 33.6 | 9.2 | 16.8 | 16.8 | 16.8 |
| Bead core width W (mm) | 24 | 16.8 | 16.8 | 16.8 | 16.8 | 16.8 | 16.8 | 16.8 | 16.8 |
| R/W | 0.35 | 0.5 | 1 | 1.5 | 2 | 0.55 | 1 | 1 | 1 |
| Taper angle ratio $\theta/\alpha$ | 1.5 | 1.5 | 1.5 | 1.5 | 1.5 | 1.5 | 1.5 | 1.5 | 1.5 |
| Rim diameter BT (mm) | 571.5 | 571.5 | 571.5 | 571.5 | 571.5 | 571.5 | 571.5 | 571.5 | 571.5 |
| Bead core diameter BC (mm) | 573.5 | 573.5 | 573.5 | 573.5 | 573.5 | 573.5 | 571.5 | 569.5 | 566.5 |
| BT-BC (mm) | −2 | −2 | −2 | −2 | −2 | −2 | 0 | 2 | 5 |
| Bead apex height AH (mm) | 45 | 45 | 45 | 45 | 45 | 45 | 45 | 45 | 45 |
| Rim flange height RH (mm) | 12.7 | 12.7 | 12.7 | 12.7 | 12.7 | 12.7 | 12.7 | 12.7 | 12.7 |
| AH/RH | 3.5 | 3.5 | 3.5 | 3.5 | 3.5 | 3.5 | 3.5 | 3.5 | 3.5 |
| Minimum distance z (mm) | 3.5 | 3.5 | 3.5 | 3.5 | 3.5 | 3.5 | 3 | 2.5 | 2 |
| Test results | | | | | | | | | |
| Bead heat generation | 88 | 83 | 85 | 87 | 88 | 83 | 82 | 80 | 78 |
| Tire weight | 90 | 88 | 88 | 88 | 88 | 88 | 88 | 88 | 88 |
| Production eficiency & cost | no good | no good | good | good | good | good | good | good | good |
| Strenght of Carcass Turnup | — | 105 | 100 | — | — | 105 | 110 | 115 | 115 |

Figure 13:
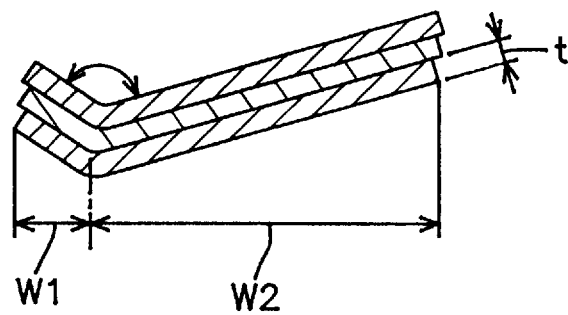
FIGS. 13 and 14 are cross sectional views, each showing the bead core used in comparison tests.

| Tire | Ex. 20 | Ex. 21 | Ex. 22 | Ex. 23 | Ex. 24 | Ref. 11 | Ref. 12 | Ref. 13 | Conv. |
|---|---|---|---|---|---|---|---|---|---|
| Bead contour | FIG. 16 | FIG. 16 | FIG. 16 | FIG. 16 | FIG. 16 | FIG. 16 | FIG. 16 | FIG. 16 | FIG. 20 |
| Bead core contour | FIG. 9 | FIG. 9 | FIG. 9 | FIG. 9 | FIG. 9 | FIG. 12 | FIG. 9 | FIG. 13 | FIG. 15 |
| Thickness t (mm) | 1.5 | 1.5 | 1.5 | 1.5 | 1.5 | 1.5 | 1.5 | 1.5 | Dia. 1.55 |
| Radious R (mm) | 16.8 | 16.8 | 16.8 | 16.8 | 16.8 | 5.6 | 42 | — | — |
| Bead core width W (mm) | 16.8 | 16.8 | 16.8 | 16.8 | 16.8 | 28 | 16.8 | 16.8 | 17 |
| R/W | 1 | 1 | 1 | 1 | 1 | 0.2 | 2.5 | — | — |
| Taper angle ratio $\theta/\alpha$ | 1.5 | 1.5 | 1.5 | 1.5 | 1.5 | 1.5 | 1.5 | 1.5 | 1.5 |
| Rim diameter BT (mm) | 571.5 | 571.5 | 571.5 | 571.5 | 571.5 | 571.5 | 571.5 | 571.5 | 571.5 |
| Bead core diameter BC (mm) | 573.5 | 573.5 | 571.5 | 569.5 | 566.5 | 573.5 | 573.5 | 573.5 | 573.5 |
| BT-BC (mm) | −2 | −2 | 0 | 2 | 5 | −2 | −2 | −2 | −2 |
| Bead apex height AH (mm) | 38 | 10 | 38 | 38 | 38 | 45 | 45 | 45 | 90 |
| Rim flange height RH (mm) | 12.7 | 12.7 | 12.7 | 12.7 | 12.7 | 12.7 | 12.7 | 12.7 | 12.7 |
| AH/RH | 3 | 1 | 3 | 3 | 3 | 3.5 | 3.5 | 3.5 | 7.1 |
| Minimum distance z (mm) | 3.5 | 3.5 | 3 | 2.5 | 2 | 3.5 | 3.5 | 3.5 | 3.5 |
| Test results | | | | | | | | | |
| Bead heat generation | 84 | 84 | 82 | 79 | 77 | 92 | 98 | 97 | 100 |
| Tire weight | 90 | 90 | 89 | 87 | 85 | 92 | 90 | 88 | 100 |
| Production eficiency & cost | good | good | good | good | good | bad | good | good | no good |
| Strenght of Carcass Turnup | 115 | 115 | 120 | 125 | 125 | — | — | — | — |

We claim:

1. A pneumatic tire comprising a tread portion, a pair of sidewall portions, a pair of bead portions each with a bead core therein, a carcass ply extending between the bead portions and turned up around the bead cores to be secured thereto, wherein in a cross section of the tire including the tire axis, in each bead portion, the bead core is provided in the radially inner surface thereof with a swell and in the radially outer surface thereof with a concavity so that the contour of the radially outer surface and the contour of the radially inner surface are substantially parallel with each other, the swell having a radius of curvature in the range of from 0.35 to 2.0 times the width of the bead core, and the swell protruding radially inwardly from the center of the bead core in the widthwise direction thereof.

2. A pneumatic tire according to claim 1, wherein the bead core is composed of lap-windings of a continuous single strip tension member, and the strip tension member is one of a strip of steel, a strip of fiber reinforced plastic, and a strip of rubberized parallel wires.

3. A pneumatic tire according to claim 1, wherein the radius of curvature of the swell is set in the range of from 0.50 to 1.0 times the width of the bead core.

4. A pneumatic tire according to claim 1, wherein said carcass ply is turned up around the bead cores from the axial inside to the outside of the tire so that a pair of turnup portions are formed on the axial outside of the carcass main portion, a bead apex is disposed between the main portion and each of the turnup portions, the bead apex extending radially outwardly from the radial outside of the bead core so that the height thereof from the bead base line when the tire is mounted on a standard rim and inflated to a standard inner pressure is in the range of from 0.50 to 3.0 times the flange height of said standard rim, in each bead portion the turnup portion extends radially outwardly beyond the radially outer end of the bead apex so that the turnup portion adjoins and extends along the main portion, and when the tire is mounted on said standard rim and inflated to said standard inner pressure the inside diameter of the bead core is not more than the rim diameter of said standard rim, and the inside diameter of the bead core is such that the minimum distance between the bead core and the bead seat of the rim is set in the range of from 0.8 to 6.0 mm.

5. A pneumatic tire according to claim 1, wherein said carcass ply is turned up around the bead cores from the axial inside to the outside of the tire so that a pair of turnup portions are formed on the axial outside of a carcass main portion, a bead apex is disposed between the main portion and each of the turnup portions, a radially inner part of the bead apex is inserted in said concavity, and when the tire is mounted on a standard rim and inflated to a standard inner pressure the bead apex extends radially outwardly to a height from the bead base line of from 0.5 to 3.0 times the flange height of said standard rim.

6. A pneumatic tire according to claim 1, wherein the bead core is composed of windings of continuous wire.

7. The pneumatic tire of claim 1, wherein the width W1 of the swell is not less than 50% of the width W of the bead core.

8. The pneumatic tire of claim 7, wherein the swell has a single radius R of curvature of not more than 1.0 times the width W.

9. The pneumatic tire of claim 7, wherein the width W of the bead core is 4 to 40 mm.

10. The pneumatic tire of claim 1, wherein the bead core is composed of lap-windings of a continuous bead tape having a thickness of from 0.6 to 2.0 mm.

11. A pneumatic tire according to claim 1, wherein said swell has a single radius of curvature and extends all over the width of the bead core.

12. A pneumatic tire according to claim 11, wherein the bead core is composed of lap-windings of a continuous single strip tension member, and the strip tension member is one of a strip of steel, a strip of fiber reinforced plastic, and a strip of rubberized parallel wires.

13. A pneumatic tire according to claim 11, wherein the bead core is composed of windings of continuous wire.

14. A heavy duty pneumatic tire mounted on a standard rim and inflated to a standard inner pressure, comprising a tread portion, a pair of sidewall portions, a pair of bead portions, each with a bead core therein, a carcass ply extending between the bead portions and turned up around the bead cores to be secured thereto from the axial inside to the outside of the tire so that a pair of turnup portions are formed on the axial outside of a carcass main portion, a bead apex disposed between the main portion and each of the turnup portions, wherein in a cross section of the tire including the tire axis, in each bead portion, the bead core is provided in the radially inner surface thereof with a swell and in the radially outer surface thereof with a concavity so that the contour of the radially outer surface and the contour of the radially inner surface are substantially parallel with each other, the swell having a radius of curvature in the range of from 0.35 to 2.0 times the width of the bead core and protruding radially inwardly from the center of the bead core in the widthwise direction thereof, a radially inner part of the bead apex is inserted in said concavity, the bead apex extends radially outwardly to a height from the bead base line of from 0.5 to 3.0 times the flange height of said standard rim, between the maximum tire section width point P1 and a point P2 at which each bead portion starts to contact with the rim flange, the tire has a contour consisting of a convex part which has a single radius of curvature whose center is located on an axial line (L1) passing the point P1 and a concave part which extends between the point P2 and the radially inner end (P3) of the convex part, passing axially inside of an extended line of the convex part, so that the convex part and concave part are smoothly connected with each other without forming any inflection point therebetween, the maximum depth (D) of the concave part measured from said extended line is in the range of from 0.03 to 0.20 times the height (HS) of the maximum width point P1 from the bead base line (RB).

15. A heavy duty pneumatic tire according to claim 14, wherein each of the bead portions is provided with chafer rubber adjacent to the carcass ply, the chafer rubber extends from the radially inner end of a sidewall rubber to the bead bottom, defining the axially outer surface and bottom surface of the bead portion, and the 100% modulus of the sidewall rubber is 10 to 20 kgf/sq.cm, the 100% modulus of the bead apex is 14 to 84 kgf/sq.cm, the 100% modulus of the chafer rubber is 55 to 71 kgf/sq.cm, and the 100% modulus of a topping rubber of the carcass ply is 37 to 47 kgf/sq.cm.

* * * * *